MAGNETIC TRANSDUCER AND METHOD OF MANUFACTURE

Filed Aug. 29, 1962 4 Sheets-Sheet 1

INVENTORS.
John P. Woods.
Clifford D. Dransfield.
Henry R. Barta.
BY Charles F. Steininger
ATTORNEY.

INVENTORS.
John P. Woods.
Clifford D. Dransfield.
Henry R. Barta.
BY [illegible]
ATTORNEY.

INVENTORS.
John P. Woods.
Clifford D. Dransfield.
Henry R. Barta.
BY Charles F. Steininger
ATTORNEY.

INVENTORS.
John P Woods
Clifford D. Dransfield.
Henry R. Barta.
BY Charles F. Steininger
ATTORNEY United States Patent Office 3,375,574

Patented Apr. 2, 1968

3,375,574

MAGNETIC TRANSDUCER AND METHOD OF MANUFACTURE

John P. Woods, Clifford D. Dransfield, and Henry R. Barta, Dallas, Tex., assignors to Atlantic Richfield Company, a corporation of Pennsylvania Filed Aug. 29, 1962, Ser. No. 220,242
3 Claims. (Cl. 29—603)

The present invention relates to an improved magnetic recording and reproducing transducer and to the method of manufacturing same. More specifically, the invention relates to an improved magnetic recording and reproducing transducer for operating with a delay drum and the improved method for manufacturing same. For purposes of simplicity, magnetic recording and reproducing transducers will be referred to hereinafter as magnetic transducers.

To date, many types of computers and automatic data processing equipment require the use of delay drums. Since delay drums operate continuously and usually at much higher speeds than most magnetic recording systems, the recording surfaces of the delay drums and the magnetic transducers working therewith are subject to excessive wear. To reduce this wear it is conventional to separate the transducer from the recording surface with an air cushion. Many and varied magnetic transducers have been developed to operate through the air cushion with delay drums rotating at various speeds; however, to date, a completely satisfactory transducer has not been produced. In addition, the various methods for manufacturing the presently available transducers are complicated, tedious, and time consuming.

It is therefore an object of the present invention to provide an improved method of manufacturing magnetic transducers.

Another object of the present invention is to provide an improved method of manufacturing improved magnetic transducers used with delay drums.

Another object of the present invention is to provide an improved method of manufacturing magnetic transducers which lends itself to mass production techniques without lowering the quality of the transducers.

Another object of the present invention is to provide an improved method of manufacturing magnetic transducers so the head gap can be aligned in a simplified manner when a plurality of heads are used in a bank.

Another object of the present invention is to provide a magnetic transducer with improved operational characteristics.

Another object of the present invention is to provide an improved magnetic transducer that operates with a high speed delay drum.

Another object of the present invention is to provide an improved extremely rugged magnetic transducer that is capable of operating without contacting the recording surface.

Another object of the present invention is to provide an improved bobbin for use in the manufacture of magnetic transducers.

Another object of the present invention is to provide a pressure injection mold capable of producing the improved bobbin.

These and other objects and advantages of the present invention will be apparent from the following detailed description when used in conjunction with the accompanying drawings, wherein:

FIGURES 1 through 9, inclusive, illustrate the various component parts of the improved magnetic transducer and aid to illustrate the steps used in the manufacture of this transducer.

Briefly described, the invention includes an improved method of manufacturing an improved magnetic transducer, using a plurality of unitary, generally U-shaped magnetic laminations, each of the U-shaped laminations containing two legs joined at a base and two bobbins, each of the bobbins mounting an electrical winding and containing an aperture that extends generally through the center of the electrical winding comprising the steps of, (a) Positioning a plurality of unitary, generally U-shaped magnetic laminations through the apertures in the two bobbins whereby at least a portion of each leg of each of the U-shaped magnetic laminations is encircled by the electrical winding mounted on one of the bobbins, (b) Placing a generally rectangular shaped magnetic lamination in contact with the two legs of each of the U-shaped magnetic laminations, and (c) Cutting the base of each of the U-shaped magnetic laminations in a manner to separate the legs of the U-shaped laminations thereby forming a plurality of confronting pole tips.

Figure 1:
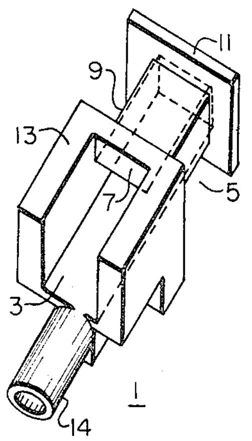
Figure 2:
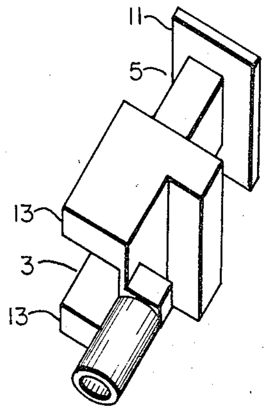
Figure 3:
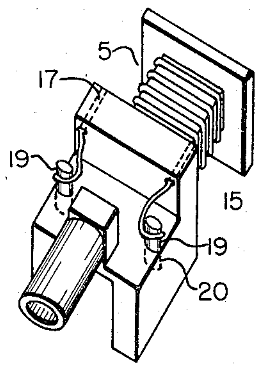
Figure 4:
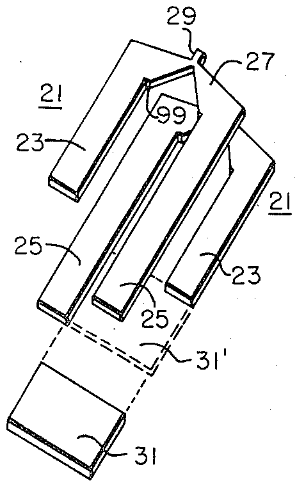
Figure 5:
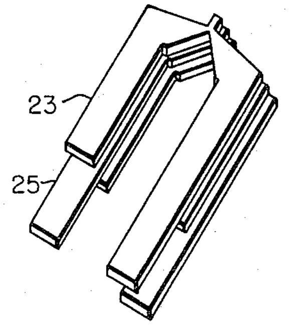
Figure 6:
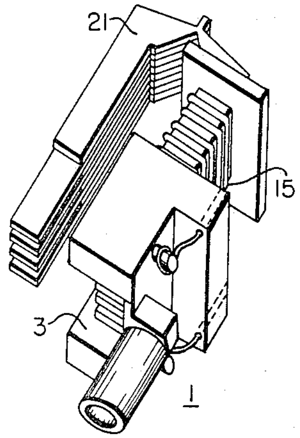
Figure 7:
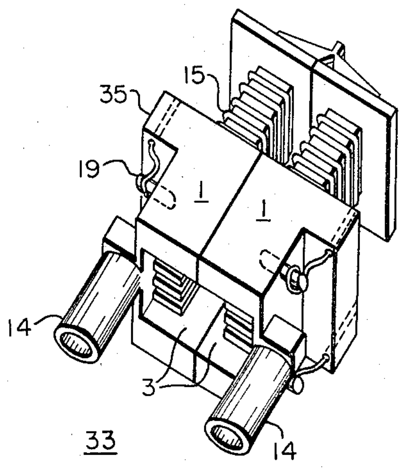

Refer now to FIGURES 1–9 which illustrate various components used in manufacturing the improved magnetic transducer. FIGURES 1 and 2 show the front and side views, respectively, of improved bobbin 1 made of a pressure injection molded, non-conductive plastic or resinous material such as nylon, polystyrene, epoxy-type resins or the like formed in a generally rectangular configuration. Bobbin 1 contains indentation 3 which is made to accommodate magnetic components used to cooperate with pole pieces to complete the magnetic circuit as will be described hereinafter. Bobbin 1 also contains indentation 5 adapted to accommodate an electrical coil and aperture 7 that extends generally along the longitudinal axis of the bobbin. For purposes of simplicity, aperture or tunnel 7 is shown in FIGURE 1 only. Walls 9 separate aperture 7 from indentation 5. The mating side of bobbin 1 is shown in FIGURE 1 as the extreme top surfaces 11 and 13. These surfaces are in the same plane and are arranged so they will mate with corresponding surfaces of a second bobbin as shown in FIGURE 7. Optional sleeve 14 is used to accommodate terminal wires that connect a coil mounted on indentation 5 with an exterior circuit as will be described hereinafter. FIGURE 3 shows bobbin 1 with its coil 15 mounted in coil indentation 5. For the illustrated embodiment coil 15 includes 880 turns of enamel-covered wire of approximately 60 ohms resistance. FIGURE 3 shows coil lead holes 17 penetrating portions of bobbin 1 along its longitudinal axis and terminal posts 19 positioned in a portion of the bobbin in a manner to connect the ends of coil 15 and external wires not shown. If excessive pressure is applied to the exterior wires, terminal posts 19 prevent delicate wires 15 from breaking. FIGURE 4 shows two unitary, generally U-shaped magnetic laminations 21. For purposes of this application, the term magnetic laminations includes thin strips of magnetic material suitable for use in constructing pole pieces for magnetic transducers. Specifically, the magnetic material includes transformer steel, hydrogen annealed molybdenum permalloy, etc. A plurality of these magnetic laminations are combined to produce the pole pieces for the magnetic transducer as will be described hereinafter. Each lamination 21 includes short leg 23 and longer leg 25 joined by base 27. The configuration of base 27 and nose 29 will be described in detail hereinafter. Broadly speaking, however, the configuration of nose 29 concentrates the magnetic flux and improves the operational characteristics of the magnetic transducer, that is, the concentration of magnetic flux in the small area of the nose records signals in smaller areas on the recording surface. In addition, the nose provides an increased output voltage during readout operations. Generally about 9 laminations 21 are employed to produce the laminated pole pieces. The exact number is determined by the thickness of laminations 21, the size of aperture 7, and the over-all operational transducer qualities desired. The illustrated embodiment utilizes laminations which are about 0.014 inch thick. Laminations 21 are preferably made by milling stacks of from about 10 to several hundred laminations to produce the same configuration and to achieve efficiency of operation. When laminations 21 are placed in bobbins 1 they are stacked as shown in FIGURE 5 so that shorter legs 23 alternately appear on each side of the stack. This arrangement allows generally rectangular shaped magnetic laminations 31, FIGURE 4, to fit between legs 23 and 25 of lamination 21 as shown by 31' and to complete the magnetic path in each lamination 21. For purposes of simplicity only one lamination 31 is shown. In the illustrated embodiment, the length of 31 is equal to the distance between the outer extremity of leg 23 and the inner extremity of leg 25. The width of 31 is designed to extend a distance equal to the difference between the lengths of the two legs. Of course, it is desirable that the thickness of laminations 31 be equal to the thicknesses of laminations 21. FIGURE 6 illustrates how bobbin 1 mounting coil 15 accommodates laminations 21. Of course, the entire group of laminations 21 may be inserted into one or both bobbins simultaneously or individual laminations may be so inserted. FIGURE 7 illustrates a complete magnetic transducer interior subassembly 33; however, laminations 31 are not shown for purposes of simplicity. The subassembly includes two bobbins 1 positioned so their mating sides are in face-to-face relationship. In this position the bobbins' respective indentations 3 form a cavity to receive laminations 31 which contact the legs of laminations 21 as described heretofore. Terminal posts 19 are protected by projection 35 forming part of a secondary side of bobbin 1. Optional sleeves 14 are used to house exterior wires, not shown, connected to terminal posts 19. See FIGURE 9 for the position of sleeves 14 on the finished magnetic transducer.

Figures 8, 9:
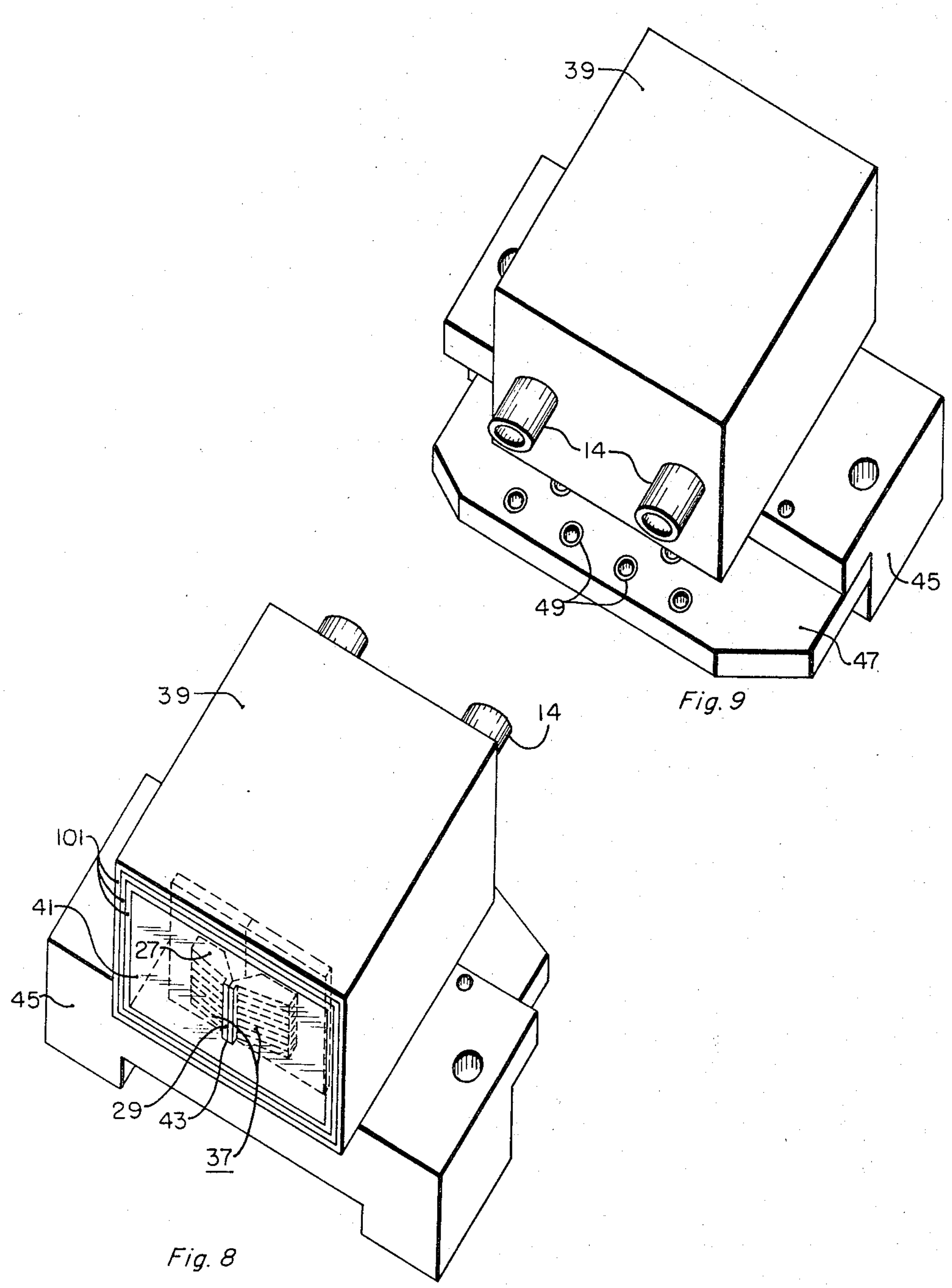

FIGURE 8 is a view showing the operating end of the completed magnetic transducer. Laminations 21 have been modified, as will be described hereinafter, to produce pole pieces 37. For purposes of simplicity only a portion of the magnetic transducer's interior subassembly 33 is shown. Pole pieces 37 are shown positioned within case 39 with only a portion of noses 29 extending above cementing material 41. The cementing material may be a suitable plastic or potting material. This material is shown surrounding pole pieces 37 and separating same from case 39. Air gap 43 is shown separating the confronting pole tips of 37. Mounting bracket 45 is one type of bracket that may be attached to case 39. FIGURE 9 is a bottom view of FIGURE 8. Sleeves 14 are shown extending through case 39. Printed circuit board 47 can be connected to bracket 45 by securing means passed through holes shown in bracket 45. Board 47 serves as a convenient means for providing a parallel or series connection between the two coils 15 mounted in interior subassembly 33. Exterior wires, not shown, are connected to terminal posts 19, FIGURE 7, and passed through sleeves 14, FIGURE 9 to various eyelets 49 depending on the connection desired between coils 15. The actual printed connections on board 47 are located on the reverse of the board as shown. It is to be understood that bracket 45 and printed circuit board 49 are not essential to the operation of the transducer and serve merely as optional accessories.

Figure 10:
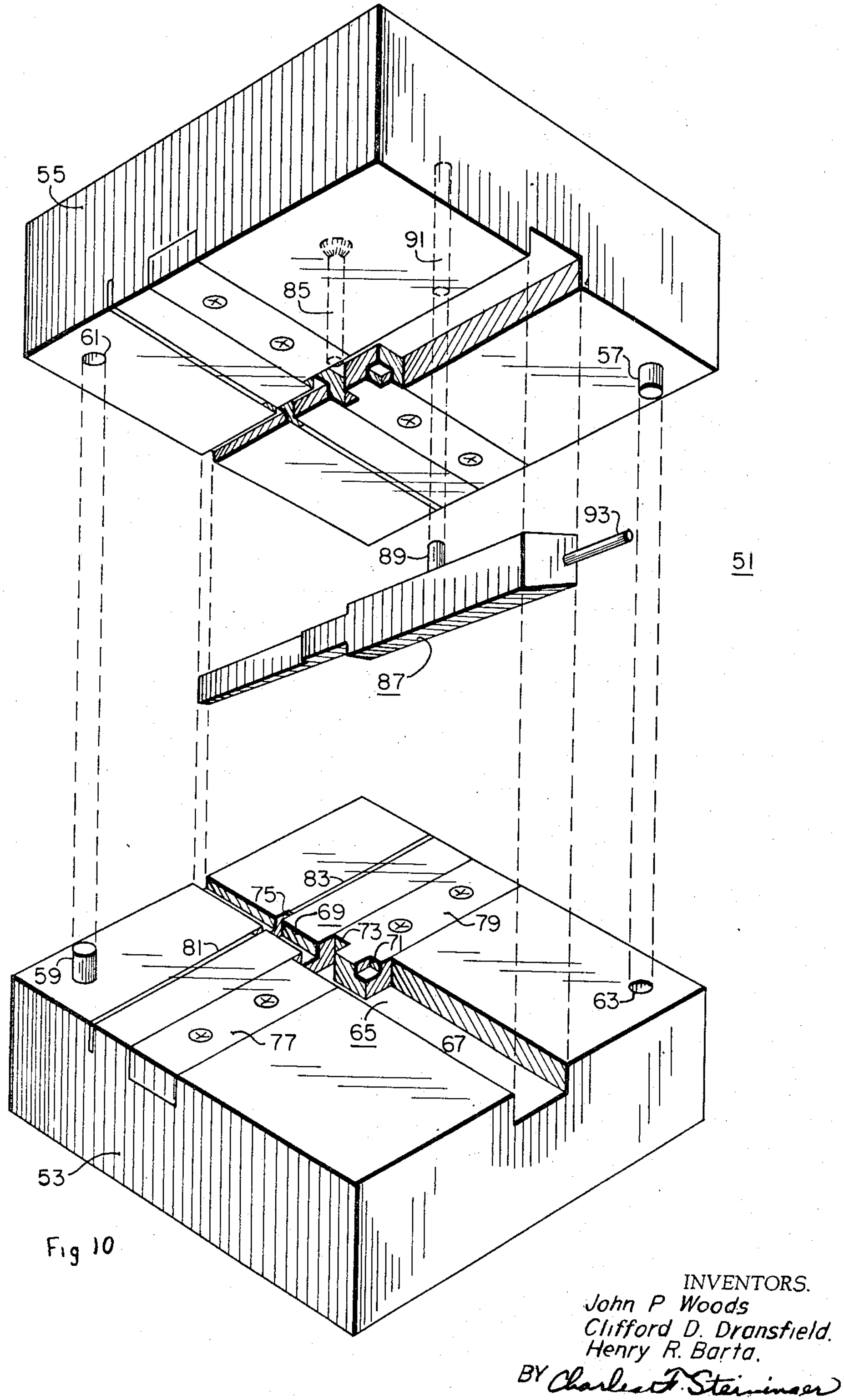
FIGURE 10 shows a detailed drawing of the pressure injection mold used to produce the bobbin shown in FIGURES 1 and 2.

FIGURE 10 represents a pressure injection mold suitable for forming bobbins 1. Mold 51 is composed of a first section 5 and a second section 55. Dowels 57 and 59 are adapted to cooperate with holes 61 and 63. First section 53 contains a substantially rectangular depression 65 extending the extent of one dimension of the section.

Depression 65 includes a relatively deep, wide cavity 67 and a relatively shallow, narrow cavity 69 extending from 67. Cavity 67 includes notch 71 and indentation 73. Cavity 69 includes indentation 75 that extends on both sides of 69. Section 55 contains a mirror image of depression 65. Blocks 77 and 79 inserted in and secured to 53 as shown facilitate the machining of depression 65 in section 53. Blocks 1 and 83 are inserts that simplify the machining of 75. Pressure injection aperture 85 is used to fill the mold depression. Metallic core 87 has a generally rectangular configuration and is used to cooperate with the depression in sections 53 and 55 to form bobbin 1. Core 87 fits in depression 65 as shown in FIGURE 10. Dowell 89 fits into hole 91 as shown to aid in positioning the core. Pin 93 is optional and is used to aid in freeing the core from mold section 53.

Figure 11:
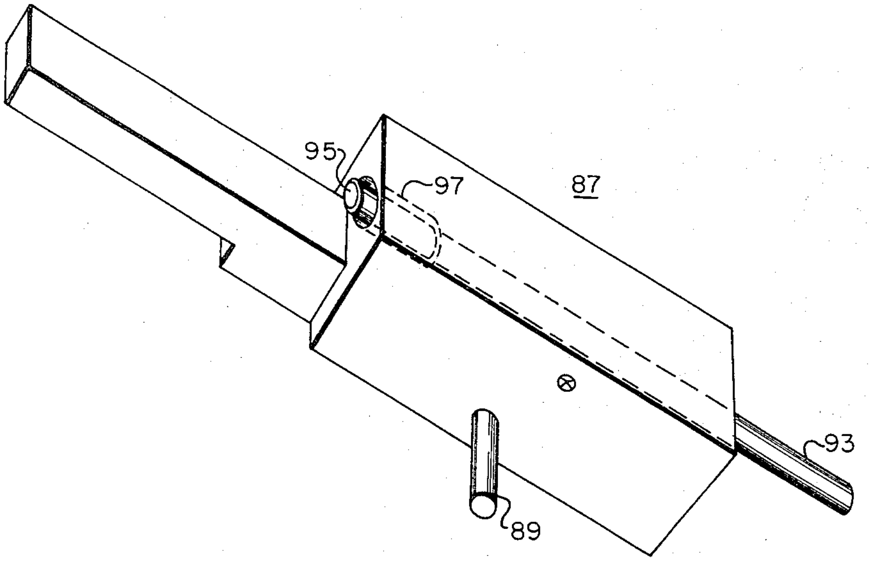
FIGURE 11 shows a detailed drawing of the removable core used in the injection mold.

FIGURE 11 shows a detailed drawing of core 87. Pin 95 is shown projecting out of hole 97 in the core. This pin may or may not be part of pin 93. Pin 95 and hole 97 cooperated with notch 71 in sections 53 and 55 to produce sleeve 14, FIGURE 1.

After much experimentation it has been found that a complicated component such as bobbin 1 shown in FIGURES 1 and 2 can best be produced by pressure injection molding such as illustrated in FIGURE 10. To produce the same bobbin by potting, machining or other conventional bobbin making operation requires excessive labor and expense. For instance, if the bobbin is produced by machining operations, average production amounts to about one bobbin per machinist every three hours. Potting is equally impractical since a relatively long setting or curing period is required. In addition the potting operation cannot produce the extremely thin walls 9 that are required to separate coil 15, FIGURE 7, from magnetic laminations 21. For best operation of the transducer, wall 9 should range from about 0.004 to 0.015 inches thick. When a pressure injection mold such as shown in FIGURE 10 is utilized to produce the bobbins, average production can range up to about 35 bobbins per mold per hour. The pressure injected plastic is forced into the mold under a pressure of about 4,000 p.s.i. so that thin walls 9, FIGURE 1, are produced and the entire bobbin is formed within a matter of seconds. Since the operation utilizes a cold mold, the plastic dries instantly and the bobbin can be removed immediately after injection.

Consider now, in detail, the method of manufacturing the magnetic transducer as illustrated in the drawings. The illustrated transducer is designed for optimum operation with delay drums rotating at recording surface speeds of between approximately 150 inches per second to 1200 inches per second. Molten nylon is pressure injected through aperture 85 in depression 65 in mold 51, FIGURE 10, to form bobbins 1, FIGURE 1. Each bobbin's over-all length is approximately 0.75 inch and maximum width is approximately 0.30 inch. After the molding operation, flashings are removed, coil lead holes 17, FIGURE 3, are drilled and terminal post holes 20 are drilled and tapped in each bobbin. The lead and terminal post holes can be molded instead of drilled; however, this complicates mold 51 considerably. Regardless of the way the holes are made, terminal posts 19 are then placed in each tapped hole and 880 turns of "Bondex" enamel-covered copper wire No. 40, made by Essex Wire Corp., of Fort Wayne, Ind., are wound around indentation 5 on each bobbin. The winding operation is preferably done automatically by a conventional "off the shelf" coil winder. The ends of each winding 15 are positioned through lead holes 17 and soldered to terminal posts 19. Terminal posts 19 are screwed into the bobin so that if excessive pressure is applied to the exterior wires the post will not move and break the fine copper wire. The generally U-shaped laminations 21, FIGURE 4, are conveniently made by operating simultaneously on a stack of silicon transformer steel stock, each piece of stock measuring approximately 0.375 by 0.75 by 0.014 inch. The number of pieces in the stack usually range from 10 to 200 and are placed in a suitable milling fixture so that an inside rectangular channel approximately 0.531 by 0.156 inch is milled in the stack. Next a 60 degree V groove is milled to a depth of about 0.093 inch in the bottom of the channel, i.e., in base 27 of each lamination in the stack. The V groove in each base 27, FIGURE 4, serves to concentrate the magnetic flux near the magnetic tape when the transducer is in operation. Note that shoulder 99, FIGURE 4, is produced in the second milling operation so that the edge of the bobbin can engage the shoulder and support the lamination. Nose 29 is approximately 0.028 inch wide by 0.035 inch long and is produced by milling the edges of bases 27 to generate angles approximately +13 degrees with a line perpendicular with legs 23 and 25. After the milling operations, the outside edge of each leg is ground so that the width of each leg is reduced to a width of approximately 0.094 inch thereby reducing the over-all width of the lamination to approximately 0.344 inch. One of the legs of each lamination 21 is then milled to produce leg 23 which is approximately 0.187 inch shorter than the remaining leg 25. Magnetic laminations 31 are produced in a similar manner; i.e., a stack of silicon transformer steel stock or the like is ground to approximately 0.187 by 0.234 by 0.014 inch. Nine laminations 21 are then positioned in apertures 7 of two bobbins 1 as shown in FIGURE 7 so that short legs 23 of adjacent laminations appear on alternate sides of the stack. The manner in which laminations 21 are placed in apertures 7 is not important. Laminations 31, FIGURE 4, are now placed in the cavity formed by the two indentations 3, FIGURE 7. One lamination 31 is placed between legs 23 and 25 of each lamination 21 so that the various legs cooperate with indentations 3 to hold laminations 31 in their proper positions. The completed interior subassembly is now ready to be placed in its protective case 39, FIGURE 8, and potted. Case 39 is constructed by nesting a plurality of five-sided containers in a manner to protect the magnetic transducer from external fields. The illustrated embodiment uses a plurality of die formed cans 99 nested as shown in FIGURE 8. The inside and outside cans are made of transformer steel or the like and the inside can is made of copper or the like. If a single magnetic transducer is desired such as shown in FIGURES 8 and 9 a single interior subassembly is placed in container 39. FIGURE 8. Of course, if a bank of heads is required, the desired number of interior subassemblies can be placed in an appropriate case. In the illustrated embodiment the interior subassembly is positioned in case 39 so that sleeves 14 extend through predrilled holes in the bottom of case 39, FIGURE 9. Of course, if optional sleeves 14 are not used, interior subassembly 33 is positioned so exterior wires connecting terminal posts 19, FIGURE 7, pass through the holes in case 39, FIGURE 9. The use of sleeves 14 is preferred, however, since they aid in positioning interior subassembly 33 within case 39 before the potting operation and aid in protecting the exterior wires. It has been found that "Araldite 502", an epoxy resin produced by the Ciba Co. of New York City, provides a satisfactory potting material. In operation, the "Araldite 502" is used with a hardening material, "HN 951", produced by the same company to pot the interior subassembly in its given position inside container 39 as shown in FIGURE 8.

After the potting operation, noses 29, FIGURE 4, are ground until approximately 0.003 to 0.007 inch of the nose remains. Next, the transducer is placed in a suitable jig and the air gap 43, FIGURE 8, is sawed in nose 29 and base 27 of each lamination, as shown, to produce pole pieces 37 and their confronting pole tips. This sawing operation is best accomplished by a jeweler's saw to produce an air gap approximately 0.003 inch in width for transducers operating with the higher speed drums and an air gap approximately 0.006 inch in width for transducers operating with the lower speed drums. If a plurality of heads is positioned in the case as described above, all air gaps are produced at the same time so that they are aligned without the requirement for future manipulation of individual heads. The gap or gaps are then filled with plastic or the like to prevent foreign matter from accumulating in the air gap.

Although the transducer described above is well suited to operate with various types of magnetic recording surfaces it is best suited to operate with storage drums mounting metallic magnetic recording surfaces such as described in copending application Ser. No. 220,193, filed Aug. 29, 1962, now Patent No. 3,312,978, owned by a common assignee. Therefore, it is to be observed that although a specific embodiment of the invention has been illustrated and described for operating with drums rotating within a certain speed range and component sizes and configurations recited therewith, various modifications and substitutions may be made, which will be obvious to those skilled in the art, without departing from the scope of the present invention which is limited only by the appended claims.

We claim:

1. A method of manufacturing a magnetic transducer comprising the steps of:

(a) pressure injection molding plastic bobbins, each of the bobbins containing at least one aperture, (b) winding a predetermined number of turns of wire around each bobbin, (c) positioning a predetermined number of unitary, generally U-shaped magnetic laminations through corresponding apertures in two of said bobbins whereby portions of said U-shaped magnetic laminations are encircled by said wire on said bobbins, (d) placing a generally rectangular shaped magnetic lamination in contact with the two legs of each of said U-shaped magnetic laminations, (e) placing said two bobbins in a metallic frame in a manner to expose the base portion of each of said U-shaped magnetic laminations and filling said frame with plastic material, (f) cutting said base portion of each of said U-shaped magnetic laminations in a direction generally parallel to the long axis of said U-shaped magnetic laminations to form a plurality of confronting pole tips.

2. In a method as set forth in claim 1 wherein the base portion of each of the U-shaped magnetic laminations is ground.

3. In a method as set forth in claim 1 wherein two holes are drilled in each of the bobbins and terminal posts placed therein.

References Cited

UNITED STATES PATENTS

| | | | |
|---|---|---|---|
| 2,346,555 | 4/1944 | Cobb | 29—155.5 |
| 2,481,393 | 9/1949 | Camras | 179—100.2 |
| 2,563,393 | 8/1951 | Buys | 336—198 |
| 2,767,253 | 10/1956 | Camras | 179—100.2 |
| 2,811,203 | 10/1957 | Garbarino | 336—217 X |
| 2,989,711 | 6/1961 | Smith | 336—217 X |
| 3,000,078 | 9/1961 | Emenaker | 29—155.5 |
| 3,023,387 | 2/1962 | Jones | 336—198.2 |
| 3,058,156 | 10/1962 | O'Connor | 18—36 |
| 3,065,311 | 10/1962 | Kornei | 179—100.2 |
| 3,080,643 | 3/1963 | Wood et al. | 179—100.2 X |
| 3,105,965 | 10/1963 | Joannou | 340—174.1 |
| 3,117,349 | 1/1964 | Woods et al. | 18—36 |
| 3,117,367 | 1/1964 | Duinker et al. | 29—155.5 |
| 3,127,592 | 3/1964 | Neergaard | 340—174.1 |
| 3,229,355 | 1/1966 | Hluszko | 29—155.5 |
| 3,233,046 | 2/1966 | Moehring | 179—100.2 |

JOHN F. CAMPBELL, *Primary Examiner.*

R. W. CHURCH, *Assistant Examiner.*

UNITED STATES PATENT OFFICE
CERTIFICATE OF CORRECTION

Patent No. 3,375,574 April 2, 1968

John P. Woods et al.

It is certified that error appears in the above identified patent and that said Letters Patent are hereby corrected as shown below:

Column 3, line 72, "5" should read -- 53 --. Column 4, line 8, "Blocks 1" should read -- Blocks 81 --; line 52, "in" should read -- into --; line 68, "bobin" should read -- bobbin --. Column 5, line 45, "39." should read -- 39, --.

Signed and sealed this 2nd day of September 1969.

(SEAL)
Attest:

Edward M. Fletcher, Jr.
Attesting Officer

WILLIAM E. SCHUYLER, JR.
Commissioner of Patents